INVENTORS
VITTORIO STRAZZARI
VITTORIO GENNASI
ATTORNEY

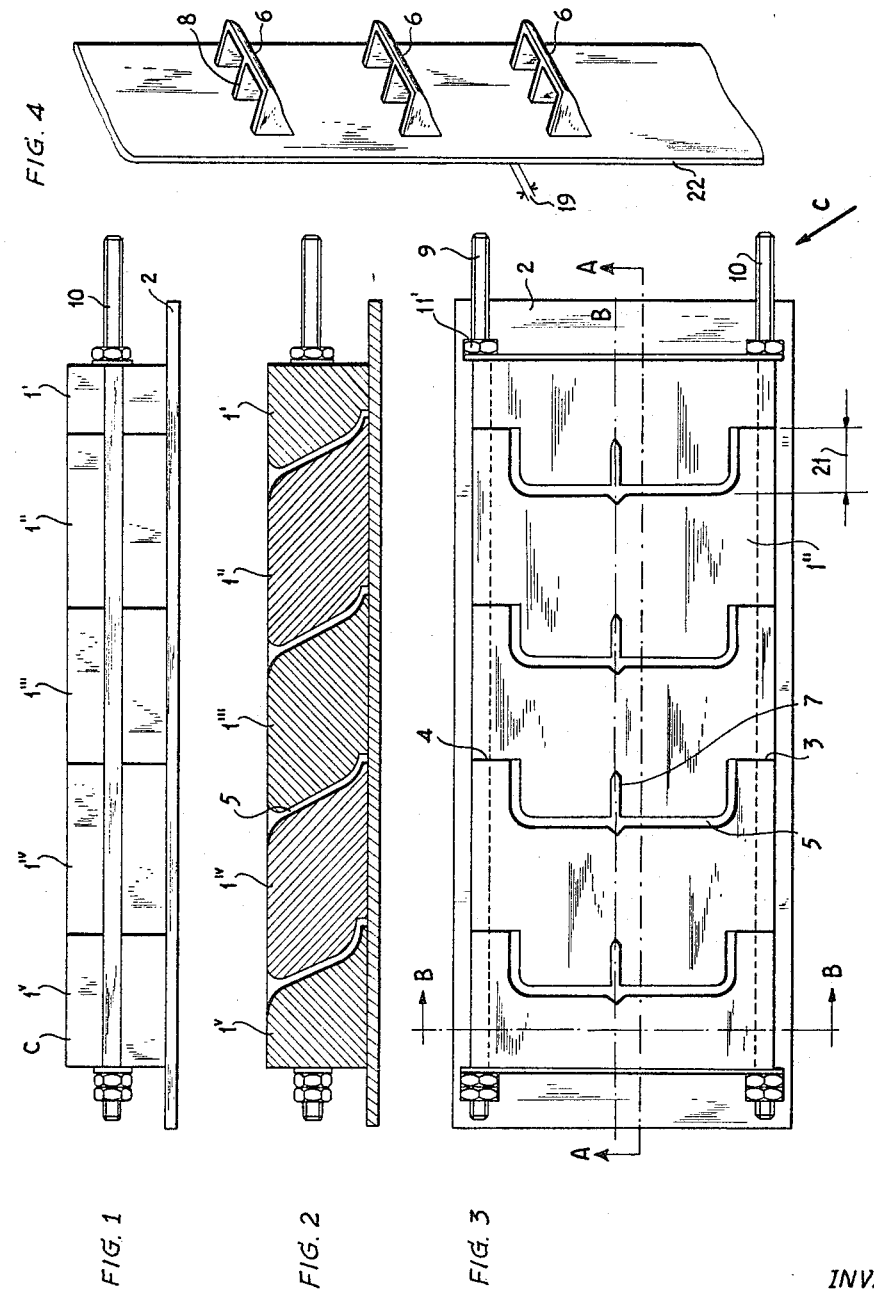

May 28, 1968  V. STRAZZARI ET AL  3,384,927
MOLD FOR MAKING REINFORCED RUBBER BELT WITH
INTEGRALLY ATTACHED CUPS
Filed July 15, 1965  3 Sheets-Sheet 3
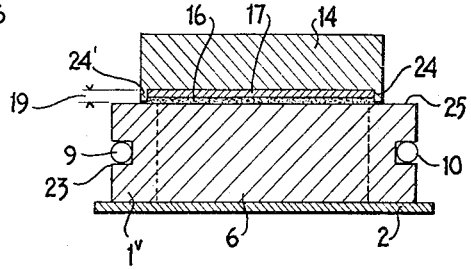
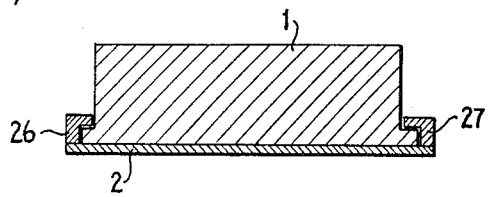
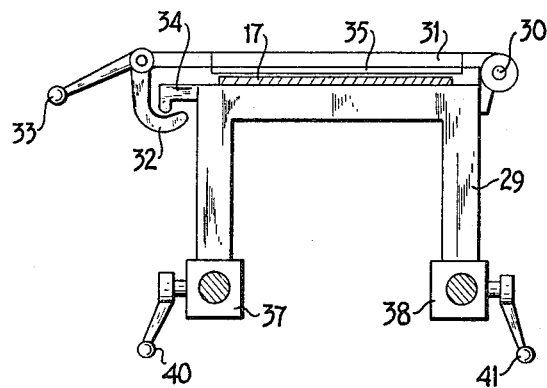
INVENTORS
VITTORIO STRAZZARI
VITTORIO GENNASI
BY
ATTORNEY

United States Patent Office 3,384,927
Patented May 28, 1968

3,384,927
MOLD FOR MAKING REINFORCED RUBBER BELT WITH INTEGRALLY ATTACHED CUPS
Vittorio Strazzari, Zola Predosa, Bologna, and Vittorio Gennasi, Bologna, Italy, assignors to S.p.A. S.I.L.G.O. Società Italiana Lavorazione Gomma, Bologna, Italy
Filed July 15, 1965, Ser. No. 472,220
4 Claims. (Cl. 18—17)

ABSTRACT OF THE DISCLOSURE

Molding apparatus for manufacturing an elongated elastomer conveyer belt with longitudinally spaced cup elements integrally affixed comprising a mold unit on a table, a plurality of mold shaping elements in the unit longitudinally alignable to contact each other to define sides, front and back of the belt and being aligned to contact each other to define a space between two contiguous mold elements corresponding to the profile of a cup, vulcanizing means, a ram, and means for feeding rubber composition and a reinforcing cloth ply to the table and ram during laminating and molding.

---

The present invention relates to an apparatus and method for molding and laminating elastomer conveyer belts embodying integral cup elements.

Conveyer belts widely used in machines in general, for industrial use to lift materials or transport materials from one point to another in a plant or to feed operating machines from above, are normally made of cloth or rubber or of cloth reinforced rubber and are smooth or provided with cups, depending on requirements.

For belts of the present type which are provided with cups for transporting the product, the cups are ordinarily made separately and then attached to the belt by screws or nails.

This manufacturing method has always been considered the only suitable method, but the so-manufactured conveyer belt has a number of serious drawbacks, particularly the rapid deterioration of the rubber at the location of the screws or nails which causes a premature loosening of the entire fastening system. There is the further disadvantage of getting the conveyed product into the screw or nail holes and the surface supporting the cup on the belt. For some materials, this gives rise to fermentation and therefore spoilage of the product being conveyed, making frequent cleanings necessary which are not always effective.

According to the present invention, a conveyer belt is molded with the cup elements already incorporated with the elastomer material of the belt and with the elements fused to the belt itself, thereby providing an integral belt cup construction without separate connectors and without undesirable spaces in the support. The life of the belt manufactured according to the present invention is practically the same as that of a high quality simple conveyer belt and the drawback of contamination and spoilage of residues in the spaces is eliminated.

These and other features and advantages of the invention will appear more clearly from the following specification in connection with the accompanying drawings, in which:

FIG. 1 shows a side elevational view of the mold;

FIG. 2 shows the mold along longitudinal section line A—A of FIG. 3;

FIG. 3 shows a plan view of the mold;

FIG. 4 shows a portion of the belt with cups incorporated integrally therewith to provide a belt product obtained by the mold which is the object of the present invention;

FIG. 6 shows the mold along transverse section line B—B of FIG. 3 with the belt composition under compression in the mold with the ram lowered;

FIG. 7 shows an alternate embodiment of molding apparatus; and,

FIG. 8 shows a longitudinal view of the preferred holding device employed to align the cloth belt for superposed assembly and subsequent laminating operations under vulcanizing conditions.

Figure 5:
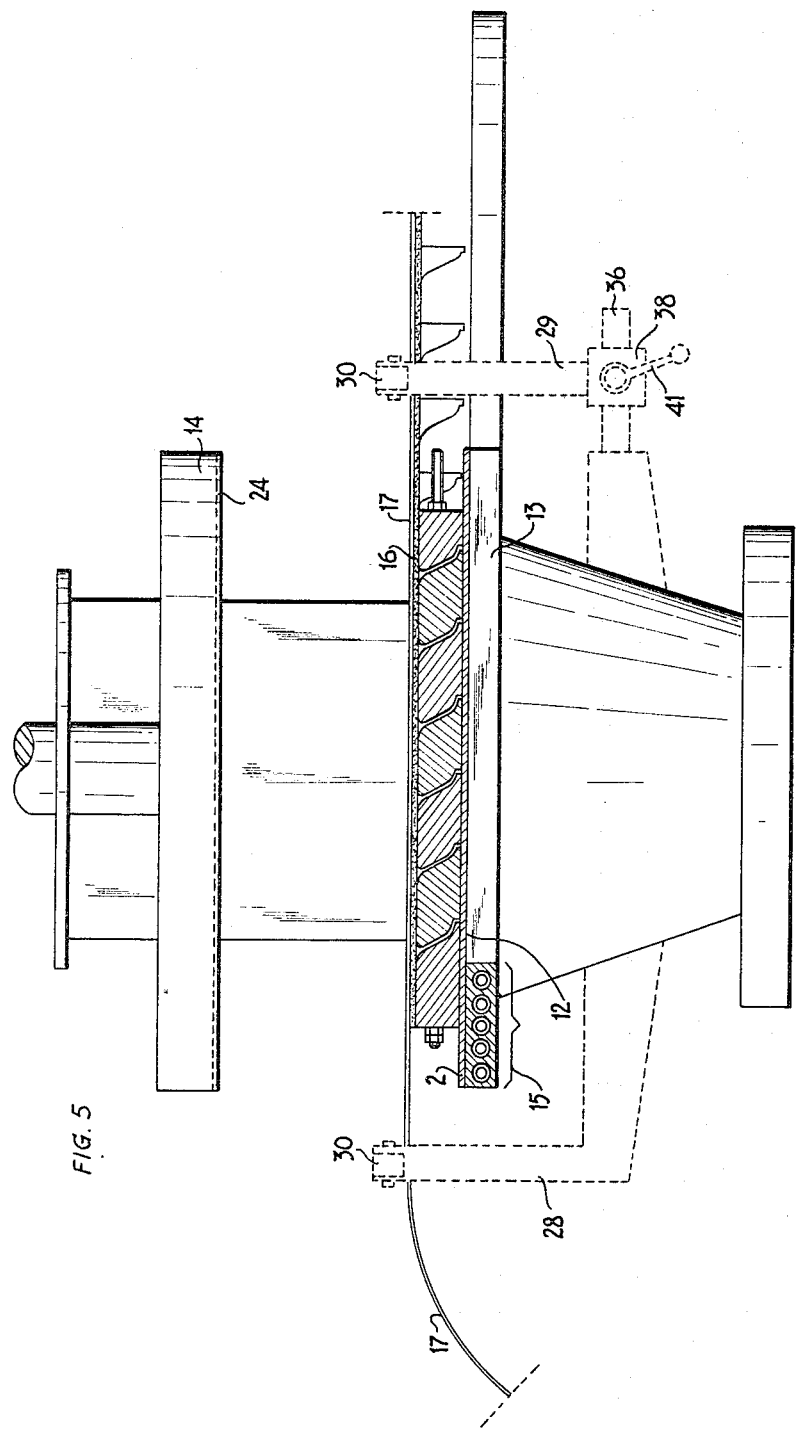
FIG. 5 shows a diagrammatic view of the mold which is placed on the press and is thereby made ready for pouring of the rubber composition which is vulcanized in the mold.

The mold according to the present invention for making belts with cup elements incorporated integrally therewith comprises a series of mold shaping elements $1'$, $1''$, $1'''$, $1^{IV}$, $1^{V}$ like each other so that when they are longitudinally placed aligned in contact with each other on the base 2, they form the cup structure between empty spaces.

Actually, these mold elements are shaped in such a way that when they are aligned in contact with each other by the surfaces 3 and 4, they create the hollow space 5 between two contiguous elements which corresponds to the profile of the cup 6, as shown in FIG. 4.

Between the surfaces 3 and 4, mold elements are provided with a depression 7 for forming the central partition 8 into the cup, 6 as shown in FIG. 4 where it can be seen that the cup 6 is integrally incorporated with the flat belt support portion 22.

In the embodiment shown in FIGS. 1, 2 and 3, the series of mold elements are held longitudinally aligned to contact each other by two side bars 9 and 10 which are slipped into channels 23a and 23b formed by molding along two opposite sides of said mold elements 1 (see FIG. 6). Said side bars act as supports and as guides for the mold elements and are each provided with at least one end threaded for holding in combination with nuts 11, the entires series of mold elements as a unit and thereby to make up a package that forms the mold unit which is subjected to vulcanizing conditions after it has been loaded with the conventional rubber composition.

It is to be noted that when nuts 11 are loosened, mold elements 1 can easily be moved apart to draw out cup elements as hereinafter described.

The mold unit thus assembled, regardless of the number of elements that compose it, is then placed on table 12 of the molding press to provide the layup which is shown schematically in FIG. 5.

The molding press may include the conventional devices for tightening the mold but these devices are not shown in accordance with the illustration of FIG. 5. The press has a fixed base 13 and a mobile ram 14, which can be heated so as to bring the rubber to the best temperature of fusion, flowing and vulcanization.

Fixed base 13 has, on one side, an end located cooling structure, shown as section 15, through which cold water pipes run so that said end portion will not reach cooking temperature. This provides a cool shelf for handling the rubber.

On the upper surface of the mold unit is then placed the rubber composition 16 to be melted, and the rubber composition is distributed so that at the points or zones of empty spaces 5 there is provided sufficient rubber composition to fill said empty spaces and thus form the cups as hereinafter described. The reinforcing cloth or cloth ply 17 is then placed over the rubber composition whereby the cloth will be laminated in one piece with the rubber to form a belt which can be short or several meters long, depending on the length that the conveyer belt requires.

After cloth 17 is assembled with the rubber, the ram 14 is lowered. The ram is provided with longitudinal projecting edges 24 and 24' (see FIG. 6) which operate like a box and contain the sides of the cloth ply 17 while the rubber, upon melting, flows down into empty spaces 5. The spacing of the ram maintains a horizontal and uniform thickness of the flowing rubber so that this thickness, together with the thickness of the cloth reinforcement, results in the desired thickness of belt 19, shown in FIG. 4.

When the vulcanizing time for the molding operation has terminated, the ram 14 is then raised and the nuts 11 are loosened on the side C by a distance equal to length 21 (see FIG. 3). The first element 1', as shown in FIG. 3, is moved from left to right of the figure, thereby lifting the respective portion of the belt with the cup already incorporated therein. The element 1" is moved the same distance thereby lifting the respective second part of the belt and the operation is repeated on to the last element $1^{IV}$ in which the cup is completely formed. It should be noted that, since the element $1^V$ is cooled by the circulation of cold water into the cooling structure 15, corresponding to the hollow space 5 defined by mold elements $1^{IV}$ and $1^V$, the rubber has undergone only a partial cooking and vulcanization so that it is capable of being adhered and spliced and can be combined with other rubber in a successive melting.

The part of the belt corresponding to the length of the mold is thus freed and the mold can be closed again.

The mold is thus ready to receive new rubber to be melted in a whole with the respective superimposed cloth ply 17 which is the continuation of the preceding portion that has already been vulcanized in the first phase (see FIG. 5). For making this, it is required that the last portion of the belt that is not perfectly vulcanized be inserted into the empty space 5 defined by mold elements 1' and 1" to maintain the uniform progression of the cups. This time, the end part of the belt which was not perfectly vulcanized will undergo complete cooking, being on the opposite end of the zone 15 and will combine with the successive new rubber.

A progression of repeated operations is followed for manufacturing a belt length greater than that of the mold and the same apparatus may be used to make any belt length without any break in continuity and in which the belt and cups constitute an integral body obtained by progressive meltings as described above.

In FIG. 4 there is shown the conveyer belt 22 including cup member 6 integral therewith, the belt 22 being in the form of a vulcanized sheet of rubber bonded to a reinforcing layer of woven cloth. The reinforcing layer may be made of natural or synthetic fibers, e.g. cotton, viscose rayon, acetate rayon, nylon, Dacron, Fiberglas, and the like, and the material of the cups is preferably of the same rubber composition as that used in the belt.

Another important aspect of the present invention relates to the ready assembly and dismantling of the mold on the table of the press, this being illustrated in FIG. 7 which shows the additional feature of guide members 26 and 27 which serve to keep the mold in alignment.

FIG. 8 illustrates a longitudinal view of the preferred holding device employed to align the cloth ply 17 for superposed assembly and subsequent laminating operations under vulcanizing conditions.

FIG. 5 shows the relationship of the cloth belt holding device in another view, illustrated in dotted line.

This holding device keeps the belt under tension during the working phase so that it will not wrinkle or have folds vulcanized therein and outside belt guides are provided to keep the belt under tension while holding it in place. Two arms 28 and 29 are provided on the two sides of the press and each of the arms comprises the clamp 30, bar 31 of suitable width hinged at 30 and with a hinge joint lever 32 on the opposite side which is operated by knob 33. When the hinge joint lever 32 is closed, its knob fits into catch 34 which is integral with arm 29.

By maneuvering knob 33, bar 31 is easily coupled and uncoupled; preferably said bar 31 presses on belt 16–17 by means of a hard rubber pad 35 attached to the bar. During the operation of melting the rubber, the cloth belt 17 can be kept stretched by two side clamps so that perfect results are obtained.

At least one, but preferably both, of the two arms, 28 and 29, is adjustable so that the belt can be positioned as desired and placed under controlled tension during melting and vulcanization. The arm 29 (see FIGS. 5 and 8) is placed on the two guides 36 by two couplings 37 and 38 which can be secured to the guide by a screw pin that can be maneuvered by levers 40 and 41. As shown in FIG. 5, the arm 29 is the only member which is adjustable, but arm 28 can also be made adjustable in the same manner.

I claim:

1. A molding apparatus for manufacturing an elongated elastomer conveyer belt having longitudinally spaced cup elements integrally affixed thereto comprising: a table support; a mold unit on said table consisting of a plurality of mold shaping elements longitudinally alignable to contact each other to define sides, front and back of the belt, said mold shaping elements being also shaped in such a way that when they are aligned to contact each other they define a space between two contiguous mold shaping elements corresponding to the profile of a cup element; a ram overlying said mold unit; heating means in said table and said ram; and means for feeding rubber composition and a reinforcing cloth ply on it upon said mold unit so that heating them at said table and ram during the molding operation said rubber composition is laminated and molded to combine with said reinforcing cloth ply and to flow down into the cup mold profile spaces to provide the cup structure elements integral with the belt body.

2. Apparatus as claimed in claim 1, wherein said mold unit includes guide bars which lock to contact each other in said mold shaping elements, said guide bars being disposed one on each side of the longitudinal edge of the mold unit which corresponds to the edge of the belt formed by some mold unit and includes removable and threaded fastening elements capable of being loosened to permit successive respective removal of said mold shaping elements for draining out the cup structure elements and thereafter tightened for molding another adjacent portion of the belt.

3. Apparatus as claimed in claim 2, wherein a part of the table adjacent one end mold space is unheated thereby permitting a partial vulcanization of the belt and facilitating splicing of one belt end to another belt end.

4. Apparatus as claimed in claim 3, including adjustable clamps, one on each side of said mold unit to accommodate the mold unit to different thicknesses of the belt.

References Cited

UNITED STATES PATENTS

| | | |
|---|---|---|
| 2,529,301 | 11/1950 | Lykken. |
| 2,597,790 | 5/1952 | Gorecki. |
| 2,611,151 | 9/1952 | Carter et al. _____ 18—36 |
| 3,109,202 | 11/1963 | Beckadolph et al. _____ 18—36 |

J. HOWARD FLINT, JR., *Primary Examiner.*